United States Patent

[11] 3,610,553

[72] Inventor Masayoshi Matsuyama Kanagawa-ken, Japan
[21] Appl. No. 855,297
[22] Filed Sept. 4, 1969
[45] Patented Oct. 5, 1971
[73] Assignee Sony Corporation Tokyo, Japan
[32] Priority Sept. 7, 1968
[33] Japan
[31] 43/64404

[54] RECORDING AND/OR REPRODUCING APPARATUS
5 Claims, 4 Drawing Figs.

[52] U.S. Cl. .................... 242/201, 242/206
[51] Int. Cl. .................... B11b 15/32, G03b 1/04
[50] Field of Search .................... 242/179 R, 201–204, 206–210

[56] References Cited
UNITED STATES PATENTS

| | | | |
|---|---|---|---|
| 2,985,395 | 5/1961 | Hoehn et al. ................ | 242/204 |
| 3,009,663 | 11/1961 | Armstead ................ | 242/201 |
| 3,472,464 | 10/1969 | Morimoto et al. ................ | 242/208 |

*Primary Examiner*—Leonard D. Christian
*Attorney*—Hill, Sherman, Meroni, Gross & Simpson

ABSTRACT: A recording and/or reproducing apparatus includes a lever that selectively rotates in relation to a rotor, and further includes a pair of driving lever means which control reel driving means and which produces back tension on the tape. A working lever connects the rotating lever and the driving lever, and back tension is produced on one of the reel-supporting means when the other reel-supporting means is rotated.

INVENTOR

MASAYOSHI MATSUYAMA

BY [signature] ATTORNEYS

INVENTOR.

MASAYOSHI MATSUYAMA

BY Hill, Sherman, Meroni, Gross & Simpson ATTORNEYS

INVENTOR.

MASAYOSHI MATSUYAMA

BY Hill, Sherman, Meroni, Gross & Simpson ATTORNEYS

RECORDING AND/OR REPRODUCING APPARATUS

BACKGROUND OF THE INVENTION

1. Field of the Invention

This invention relates to a recording and/or reproducing apparatus and more especially to a recording and/or reproducing apparatus which enables the tape to run in either direction to play from one reel to the other in either direction.

2. Description of the Prior Art

Numerous models of reversible tape recorders have been devised. However, when the tape runs to play, the tape takeup reel must be driven and, at the same time, back tension must be maintained on the forwarding reel to prevent the tape from sagging. In prior art reversible tape recorders the mechanism used to produce rotation and tension to the reels has been extremely complicated.

SUMMARY OF THE INVENTION

The object of this invention is to provide a reversible recording and/or reproducing apparatus.

Another object of this invention is to provide a recording and/or reproducing apparatus which is comparatively simple, small and very reliable.

Another object of this invention is to provide a recording and/or reproducing apparatus that allows the running direction of the tape to be changed automatically while playing.

A further object of this invention is to provide a recording and/or reproducing apparatus suitable for cassette type machines.

The present invention provides a recording and/or reproducing apparatus comprising a pair of reel supporting and a rotor that is driven by a driving means. A rotating lever rotates relative to the rotor and a pair of driving lever means have reel driving means for driving each of the reel-supporting means. Back tension means for the tape are provided. A working lever links the rotating lever and the driving lever means so that the position of the working lever causes back tension to be produced on one of the reel supporting means and the other reel-supporting means is caused to rotate.

The invention will be described in detail with reference to the accompanying drawings.

BRIEF DESCRIPTION OF THE PREFERRED EMBODIMENT

Figure 1:
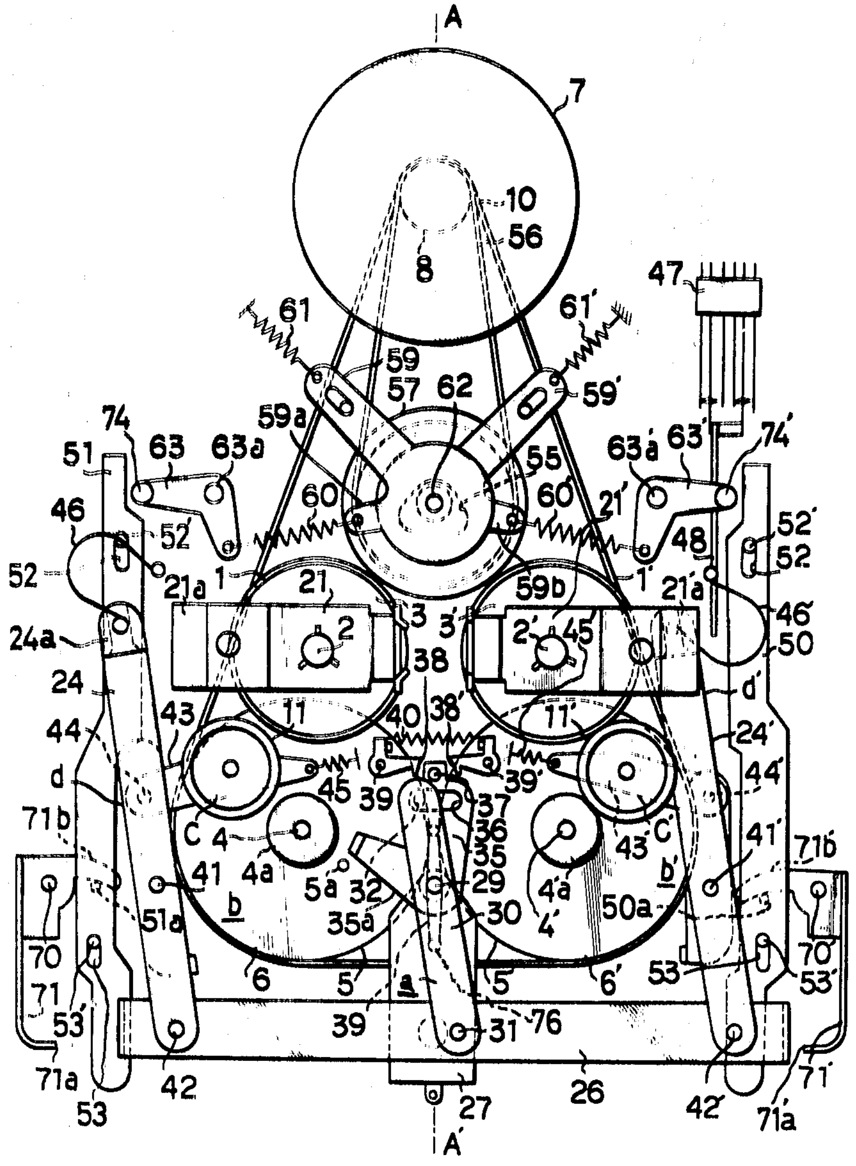
FIG. 1 is a plan view illustrating the tape running in the forward direction of one embodiment of a recording and/or reproducing apparatus in accordance with this invention.

FIGS. 1–4 illustrate the recording and/or reproducing apparatus with tape which can run in either direction, from one reel to the other, and which can record and/or reproduce while running. The tape recorder has a supply reel supporting disc 1 and a takeup reel supporting disc 1′ which are mounted to rotate in either direction. The discs are mounted symmetrically of the centerline A–A′ as shown in FIG. 1 and the left side will be explained. The differences between the left and right sides will also be given. The mechanism on the left side of the drawing is marked with reference numbers and the right side has numbers corresponding to those on the left but are primed.

Figure 4:
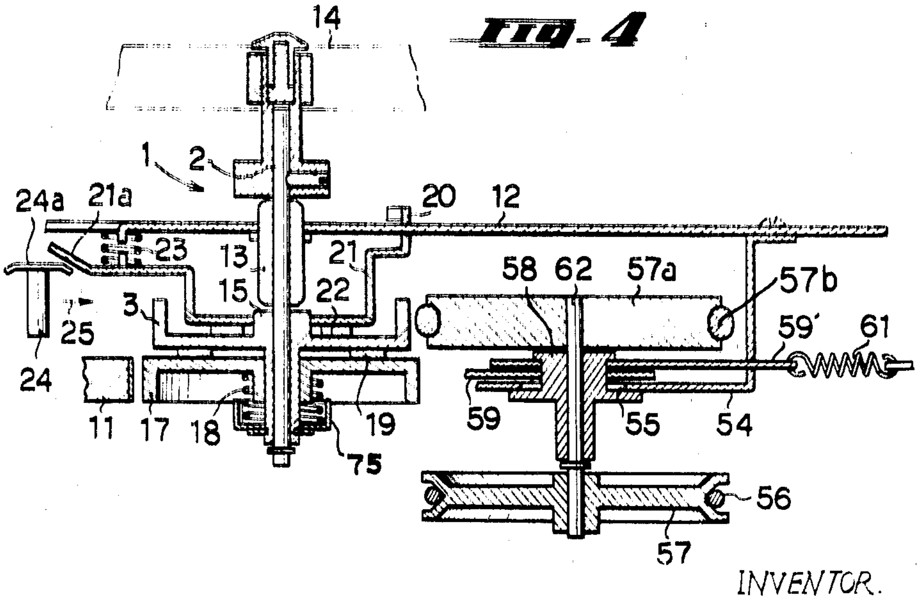
FIG. 4 is an enlarged longitudinal section illustrating one of the reel discs and the fast forwarding and rewinding means of a recording and/or reproducing apparatus shown in FIG. 1.

Capstan 4 is fixed on the flywheel 5. A belt 10 extends between the pulleys 6 and 6′ and over the motor pulley 8 which is mounted on the shaft of the driving motor 7. The reel disc 1 has a reel shaft 2 and reel disc pulley 3. A clutch pulley 17 is disposed underneath the pulley 3 as shown in FIG. 4. A pulley 4*a* is fixed on the capstan 4. An idler 11 can be moved to engage the pulleys 3 and 4*a* respectively to transmit the rotation of pulley 4*a* to the pulley 3.

FIG. 4 shows supply reel disc means 1 and fast forwarding and rewinding means. In FIG. 4, the base plate 12 is fixed and a bearing 13 rotatably journals the reel shaft 2. A cassette reel 14 can be mounted on shaft 2. Under the bearing 13 the reel disc pulley 3 is mounted. It has a boss 15 and is fixed on shaft 2. The boss 15 rotatably extends into a clutch pulley 17 mounted under the reel disc pulley 3. At the lower end of the shaft 2 a cup-shaped spring support 75 is mounted. Between the spring support 75 and the clutch pulley 17 is a coil spring 18. Between the clutch pulley 17 and the reel disc pulley 3 is a clutch ring 19 that is made of felt or the like. The reel disc pulley 3 drives the reel shaft 2 and reel 14.

On the baseplate 12 is fixed a back tension producing means comprising a back tension arm 21 that rotates with support 20 as the center and this arm 21 carries a clutch ring 22 that is made of felt or the like. The clutch ring 22 is mounted to engage the surface of reel disc pulley 3 for braking it. This brake produces back tension when the reel 14 is the payout reel. Between the baseplate 12 and the back tension arm 21 lies a coil spring 23 and when the tip of driving lever 24 is moved in the direction of arrow 25 of FIG. 4, the cam portion 21*a* of back tension arm 21 is pressed by the driving lever 24 and moves upward against resisting coil spring 23.

The rotating lever means *a* allows selection of the direction of rotation and is shown in FIG. 1 between capstans 4 and 4′. In FIGS. 1–4, the tape and the magnetic heads are omitted to simplify the drawings. Driving lever means *d* and *d′* are mounted on each side of lever *a* and support the reel driving means *c* and *c′* that drive each of reel disc means 1 and 1′ jointly with the rotating lever means *a* and the back tension arm or the back tension producing means 21 and 21′. A working lever 26 is provided to link the rotating lever *a* and the pair of driving lever means *d* and *d′*. The position of the lever 26 causes back tension and rotation to be selectively produced on the reel discs 1 and 1′ by back tension producing means 21 and 21′ and reel driving means *c* and *c′*. The rotating lever means *a* is mounted on the center of the working lever 26. The driving lever means *d* and *d′* are mounted opposite ends of the working lever 26 respectively and the entire assembly forms an E-shaped lever.

Figure 2:
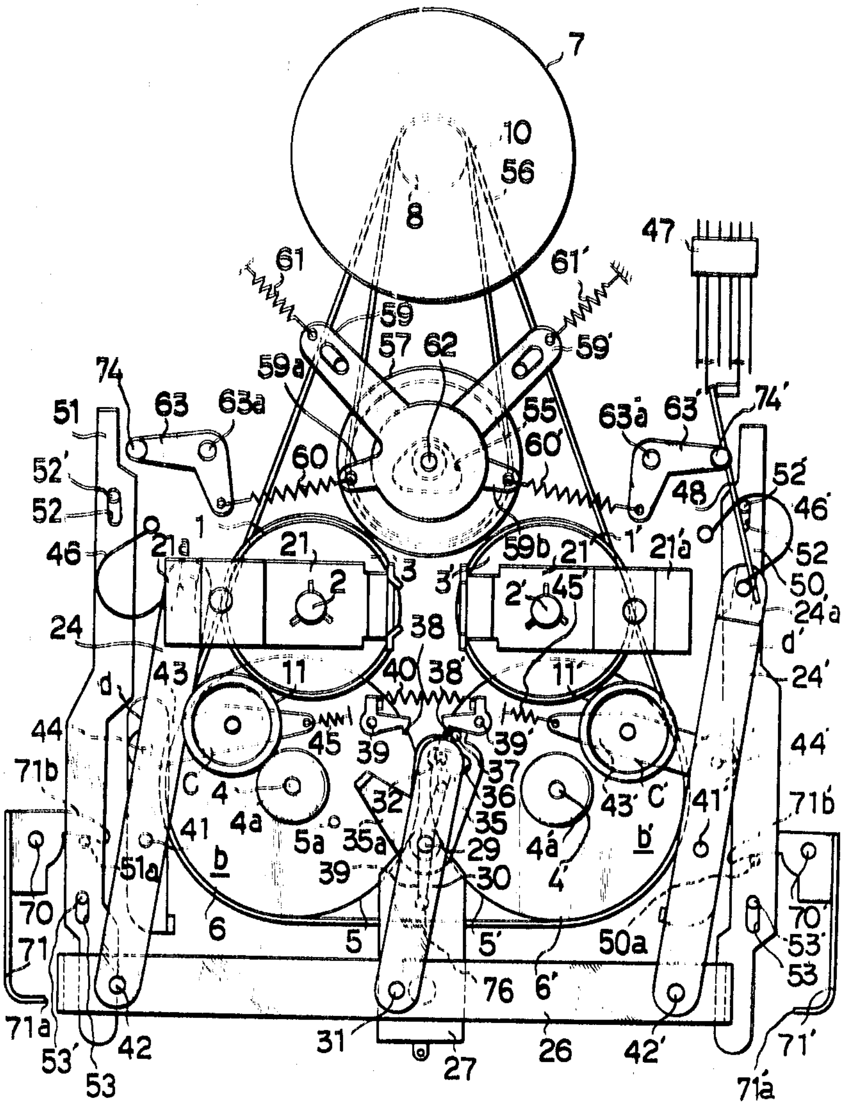
FIG. 2 is a plan view illustrating the recording and/or reproducing apparatus shown in FIG. 1 at the instant when it is reversed.
Figure 3:
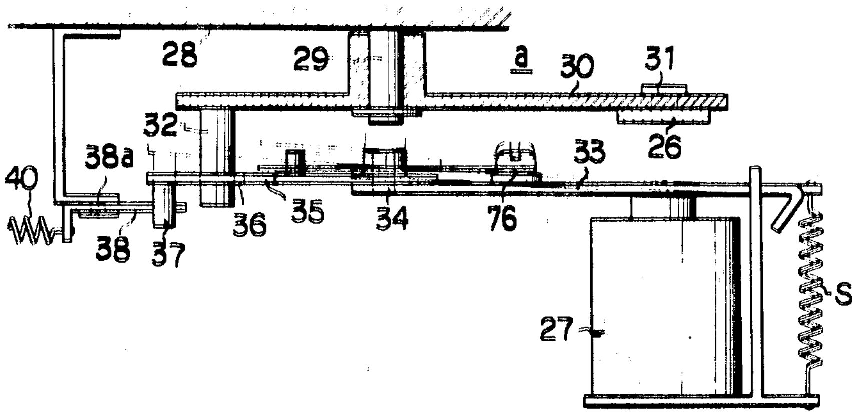
FIG. 3 is an enlarged longitudinal sectional view illustrating the direction changing means of the recording and/or reproducing apparatus shown in FIG. 1.

The rotating lever *a* is shown in FIGS. 1–3.

The rotating lever means *a* has an electromagnet 27 and when the tape reaches its end portion or at a predetermined position, the circuit including a pair of contacts are shorted by a conductive portion on the tape and the electromagnet 27 is energized. The tape may have a double track for forward and return. When the tape is running in the forward direction, the magnetic head moves to a position to read one track and when the tape reverses, the head reads the other track. Thus, when the direction of the tape changes from forward to reverse, the magnetic head and the pair of contacts move to the proper position.

The supporting shaft 29 is fixed on chassis 28. The turning lever 30 is rotatably supported by shaft 29 and one end of the lever 30 is pivoted to the working lever 26 by pin 31. The other end of lever 30, as seen in FIG. 3, has a pin 32 which extends downwardly. When the electromagnet 27 is energized an arm 33 cushions it. One end of arm 33 carries a rotating lever 35 which is supported from the supporting pin 34. Near the other end of the rotating lever 35, an arc-shaped oblong groove 36 is formed. Pin 32 is received into groove 36. The pin 76 is mounted on the cushion arm 33. The supporting pin 34 and the pin 37 mounted on the lever 35 are biased to a center position by spring loaded means as shown in FIG. 1.

When the electromagnet 27 is energized, the cushion arm 33 that occupies the position shown by dash-dot line in FIG. 3 is pulled toward the electromagnet 27 and the pin 32 is received into the oblong groove 36 as shown by full line in FIG. 3. The driving arm 35 has a projecting portion 35*a* as shown in FIG. 1 and this projecting portion 35*a* is moved by the pin 5*a* mounted on the flywheel 5 to rotate clockwise centering on the supporting point 34 when flywheel 5 rotates counterclockwise. Therefore, the turning lever 30, after transmitting the rotation of the rotating lever 35 through the pin 32, rotates in the clockwise direction about the supporting shaft 29 and this rotates the upper end of lever 30 to the right relative to FIG. 1 to the position shown in FIG. 2.

On the end of the rotating lever 35 which carries the oblong groove 36, a pin 37 is mounted. Pawls 38 and 38′ are mounted to engage the pin 37. The pawls 38 and 38′ are rotatably supported by the supporting shafts 38*a* and 38*a*′ and a spring 40 spring biases them. Therefore, when the projecting portion 35*a* is pushed by the pin 5*a* and rotates clockwise relative to FIG. 1, and the driving arm 35 rotates clockwise in FIG. 1, the pin 37 cams the pawl lever38′ and it rotates clockwise relative to FIG. 1 overcoming the spring 40 and then drops it into the locking position over the tapered end of the pawl 38′. This locks arm 35 in the position shown in FIG. 2. So long as the electromagnet 27 is energized, the rotating lever 35 is held in the position shown by full line in FIGS. 2 and 3. As the extending portion 35*a* moves out of the circumference path of the pin 5*a*, it no longer makes contact with the pin 5*a*. The working lever 26 is caused by the electromagnet 27 to move from the position shown in FIG. 1 to the position shown in FIG. 2. When the tape starts running in the opposite direction and the electromagnet 27 is deenergized, the return spring S pulls levers 33 and 35 back to the position shown in dash-dot line in FIG. 3 and the rotating lever 35 returns to the position shown in FIG. 1.

On left and right sides of the working lever 26 are mounted the driving lever means *d* and *d*′ which control the reel driving means *c* and *c*′ that drive reel discs 1 and 1′ and the back tension producing means 21 and 21′ for producing back tension on each of the reel disc means 1 and 1′. The driving lever 24 is rotatably supported from the frame of the machine by a pin 41. One end of lever 24 is rotatably attached to the working lever 26 by pin 42. A lever 43 is supported by pin 44. An idler 11 is rotatably supported on lever 43. Lever 32 is attached to coil spring 45 to spring bias it. On the free end of the driving lever 24 is attached one end of a toggle spring 46 and the other end of spring 46 is attached to the frame. Thus the driving lever 24 is arranged to move in a snap manner about the pivot point 41 and to maintain the working lever 26 in the positions shown in FIGS. 1 and 2, respectively.

Near the free end of the right side driving lever 24′ as shown in FIGS. 1 and 2 is mounted a changeover switch 47 for switching the direction of rotation of motor 7. On the movable contact of switch 47, a rod 48 is attached. Rod 48 responds to movement of the driving lever 24′. As shown in FIG. 1, when the tape is moving in the forward direction, the driving lever 24′ is rotated in the counterclockwise direction relative to the supporting pin 41′ and the idler 11′ contacts both clutch pulley 17′ and capstan pulley 4*a*′. Hence the rotation of flywheel 5′ is transmitted to the reel disc pulley 3′ through the idler 11′ and the clutch pulley 17′ and pulley 3′ rotates in the counterclockwise direction relative to FIG. 1. The rotation of driving lever 24′ causes end portion 24*a* to move in the direction of arrow 25 and pushes the back tension arm 21′ upward overcoming spring 23′. This causes the friction on the reel disc pulley 16′ due to clutch ring 22′ to become almost or nearly zero. At the same time the idler 11′ contacts the clutch pulley 17′ contacts the clutch pulley 17′ and causes the reel disc pulley 3′ to rotate by means of clutch ring 19′. This rotation allows rewinding to be accomplished.

At this time the driving lever 24 is in the position shown in FIG. 1 and the free end of the lever 24 moves to the left about its center on the supporting pin 41. As the support 43 also moves in the same direction, the idler 11 disengages the clutch pulley 17 and the capstan pulley 4*a*. As the free end of the driving lever 24 is disengaged from the back tension arm 21, spring 23 pushes the free end of the back tension arm 21 downwardly. Thus, the clutch ring 22 is pressed against the reel disc pulley 3 and applies braking to the pulley 3. This braking causes supply reel disc means 1 to pay out tape while maintaining proper back tension on the tape.

FIG. 1 illustrates the working lever 26 in the forward running position so that recording or reproducing can be accomplished while the tape moves in the forward direction.

When the tape is reversed as when one of the tracks of the tape reaches the end or predetermined position, the electromagnet 27 is automatically energized as described above. Then the pulley 6 rotates clockwise relative to FIG. 2 and the pin 5*a* pushes the projecting portion 35*a* in the opposite direction than that described above to rotate the rotating arm 35 counterclockwise relative to FIG. 1 and pin 37 is locked by the left pawl 38. This causes the working lever 26 to move to the left as shown in FIG. 2 and this movement moves driving levers 24 and 24′. Hence, the idler 11′ coupled to the driving lever 24′ is separated from the clutch pulley 17′ and the capstan pulley 4*1*′ while the idler 11 coupled to the driving lever 24 engages the clutch pulley 17 and the capstan pulley 4*a*, respectively. This causes supply reel disc means 1 to be connected to the driving source. Movement of driving lever 24′ closes switch 47 through the rod 48 and the motor 7 runs counterclockwise. Hence, the supply reel disc means 1 rotates in the opposite direction than described above and the takeup reel disc means 1′ pays out the tape while providing proper back tension to the tape. The supply reel disc means 1 and the takeup reel disc means 1′ drive the tape in a direction opposite to that described above. When conductive portions of metal contacts on the tape are detected by a pair of contacts, the electromagnet 27 is again energized and the tape will again be reversed.

The fast forward and rewind means will now be explained. Near each end of the working lever 26 are disposed fast forwarding rod 50 and rewinding rod 51, respectively. The fast forwarding rod 50 extends in a direction which is at a right angle to the lever 26 and has oblong grooves 52 and 53. Grooves 52′ and 53′ receive pine 52′ and 53′ mounted on the frame and form the pin-slot guide means. During fast forward, the fast forward lever 50 is pushed. The rewind rod 51 operates similar to the fast forward rod 50.

FIG. 4 illustrates bearing 58 in the opening 55 of the supporting portion 54. The bearing 58 supports the shaft 62 whose lower end is fixed to pulley 57 which is driven by the motor pulley 8 through the belt 56. The upper end of shaft 62 is attached to the pulley 57*a*. The guide arms 59 and 59′ cause bearing 58 to draw near to the reel disc means 1 and 1′, respectively, and carry forward springs 60 and 60′ that pull the bearing 58 to the driving position and return springs 61 and 61′ pull the bearing 58 in the opposite direction.

Pulley 57 on the shaft 62 is connected with motor pulley 8 by belt 56 and the supporting portion 54 is provided with a triangular or guide opening 55 in which bearing 58 is inserted. The bearing 58 carries the guide arms 59 and 59′ respectively. Between the projected portions 59*a* and 59*a*′ on arms 59 and 59′ and the L-shaped levers 63 and 63′ are mounted springs 60 and 60′, respectively. The arms 59 and 59′ are provided with an ordinary pin-slot guide means and have comparatively weak return springs 61 and 61′ which have one of their ends attached to the arms 59 and 59′. The pulley 57*a* is normally separated from the supply reel disc pulley 3 and the takeup reel disc pulley 3′. The springs 60 and 60′ are stonger than the springs 61 and 61′ and these springs 60 and 60′ are mounted on one end of the levers 63 and 63′, respectively. On the other end of the levers 63 and 63′, pins 74 and 74′ are provided to link the end portions of the rods 50 and 51. The middle portions of the levers 63 and 63′ are rotatably supported by the supporting pins 63*a* and 63*a*′, respectively. Hence, when the fast forward rod 50 is moved, the lever 63′ rotates counterclockwise relative to FIG. 1 with the supporting pin 63$a'$ as the center and, for this reason, it pulls the guide arms 59 and 59' toward the takeup reel disc pulley 3' through the spring 60'. This pulls the rubber ring 57$b$ of the outer circumference of the pulley 57$a$ against the reel disc pulley 3'. The bearing 58 can move within the guide opening 55 for this purpose.

The other guide arm 59 has the same structure as the guide arm 59' and these arms 59 and 59' overlap each other near the bearing 58. The projecting portion 59$a$ also connects through the strong spring 60 to the lever 63 which engages the rod 51. In rewinding, when the rewinding rod 51 is pressed the lever 63 rotates clockwise relative to FIG. 1 so that the pulley 57$a$ that interlocks the lever 63 through the spring 60 and the guide arm 59 contacts the supply reel disc pulley 3. This causes switch 47 to be moved and motor 7 runs in reverse.

The lever 71 that is rotatably supported by the shaft 70 is mounted near the rewind rod 51. Relative to FIG. 1, the lower end 71$a$ of the lever 71 is adjacent the end portion of the rod 51 and the upper end 71$b$ engages the pin 51$a$ mounted on the rod 51. A similar lever 71' is also provided near the fast forward rod 50.

During rewind, if the rewind rod 51 is pressed, the pulley 57$a$ contacts the pulley 3 as above and, the upper end 71$b$ of the lever 71 is pressed so that the lower end of lever 71 rotates counterclockwise relative to FIG. 1 to press the lever 26 to the right relative to FIG. 1. This causes the rotation of motor 7 to return to the original direction due to the action of switch 47. When the fast forward rod 50 is pressed, the rod 50 presses the lever 26 in the opposite direction (to the left relative to FIG. 1) so that the motor 7 runs in reverse.

Thus, fast forward and rewind can be done by the movement of the bearing 58 within the opening 55. The bearing 58 of shaft 62 of the pulley 57$a$ is connected to the driving source loosely within the triangle-shaped guide opening 55 on the fixed portion 54 and, therefore, as compared to the prior art where an idler is employed, the structure of this invention is comparatively simple and improved performance is obtained.

Although the illustrative embodiment of this invention has been described in detail above with reference to the accompanying drawings, it is to be understood that it is not limited to this precise embodiment, and that various changes and modifications may be effected therein by one skilled in the art without varying from the scope or spirit of the invention as defined in the appended claims. Changes and modifications, such as the omissions of capstan pulley 4$a'$ and idler 11' and guide arms 59 or 59' and the use of various detecting means for reel location may be used without departing from the invention.

What is claimed is:

1. An automatic tape recording and reproducing apparatus including a frame for driving a pair of reels in either direction at two different speeds comprising:

a reversible driving means;

a pair of capstan flywheels driven by said driving means;

a pair of reel support shafts for said reels;

a pair of reel disc pulleys mounted on said reel support shafts;

an E-shaped control linkage mounted on said frame;

a pair of idlers mounted on said control linkage and a first one of said idlers movable into engagement with one of said capstan flywheels and one of said reel disc pulleys when the control linkage is in a first position and the second one of said idlers movable into engagement with the other of said capstan flywheels and the other of said reel disc pulleys when the control linkage is in a second position;

a pair of friction braking means mounted adjacent said reel disc pulleys;

means for applying said braking means to one or the other of said reel disc pulleys when it carries the payout reel to provide back tension;

said friction braking means each comprising a back tension arm pivotally attached to the frame and movable toward the face of said reel disc pulleys to engage them;

spring means biasing said back tension arm toward said reel disc pulleys;

means carried by said control linkage engageable with said back tension arms to move them out of engagement with said reel disc pulleys;

a fast forward and reverse pulley coupled to said driving means;

a fast forward lever movable relative to said frame to couple said fast forward and reverse pulley to one of said reel disc pulleys;

a fast reverse lever movable relative to said frame to couple the fast forward and reverse pulley to the other of said reel disc pulleys; and, switch means controlled by said fast forward and reverse levers for controlling said driving means.

2. An automatic tape recording and reproducing means according to claim 1 comprising latching means comprising a pair of pawls supported on said frame and engageable with said control linkage to hold it in a selected position.

3. An automatic tape recording and reproducing means according to claim 1 wherein said switch means are controllable by the tape on said reel support shafts.

4. An automatic tape recording and reproducing means according to claim 3 wherein over-the-center spring means are mounted between the frame and said control linkage to hold it in one of two positions.

5. An automatic tape recording and reproducing apparatus according to claim 1 wherein said fast forward and reverse pulley is supported on a movable bearing to allow it to move into engagement with said reel pulleys under control of said fast forward and reverse levers.

UNITED STATES PATENT OFFICE

CERTIFICATE OF CORRECTION

Patent No. 3,610,553 Dated October 5, 1971

Inventor(s) MASAYOSHI MATSUYAMA

It is certified that error appears in the above-identified patent and that said Letters Patent are hereby corrected as shown below:

Column 4, line 23, change "4/' " to --4a'--.

Column 4, line 42, change "pine" to --pins--.

Signed and sealed this 11th day of July, 1972.

(SEAL)
Attest:

EDWARD M.FLETCHER,JR.
Attesting Officer

ROBERT GOTTSCHALK
Commissioner of Patents